Aug. 25, 1959 J. R. SALERNO 2,901,305
DOOR ASSEMBLY IN A VENDING MACHINE FOR FROZEN CONFECTIONS
Filed Aug. 30, 1954 2 Sheets-Sheet 1
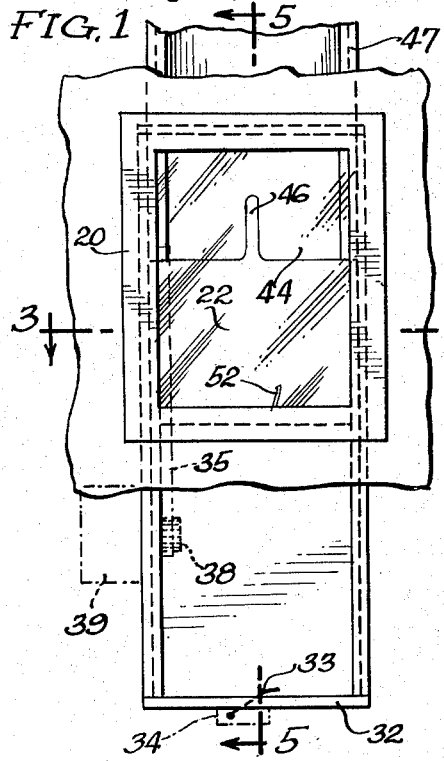
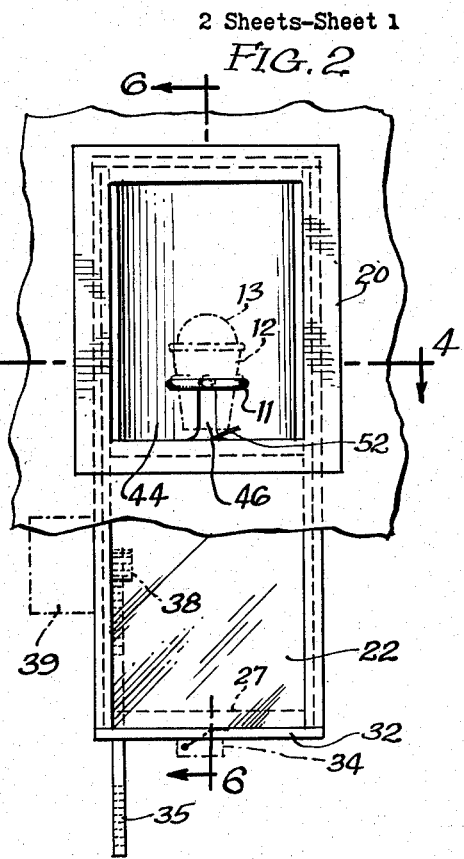
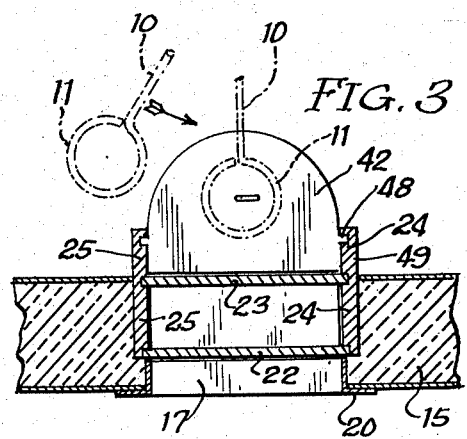
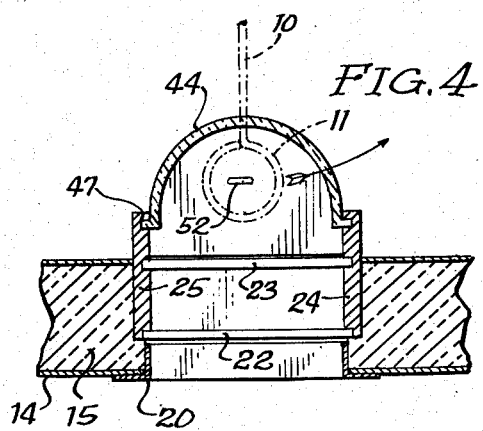
INVENTOR.
Joseph R. Salerno
BY Toms, McDougall,
Williams & Ketch
Attorneys

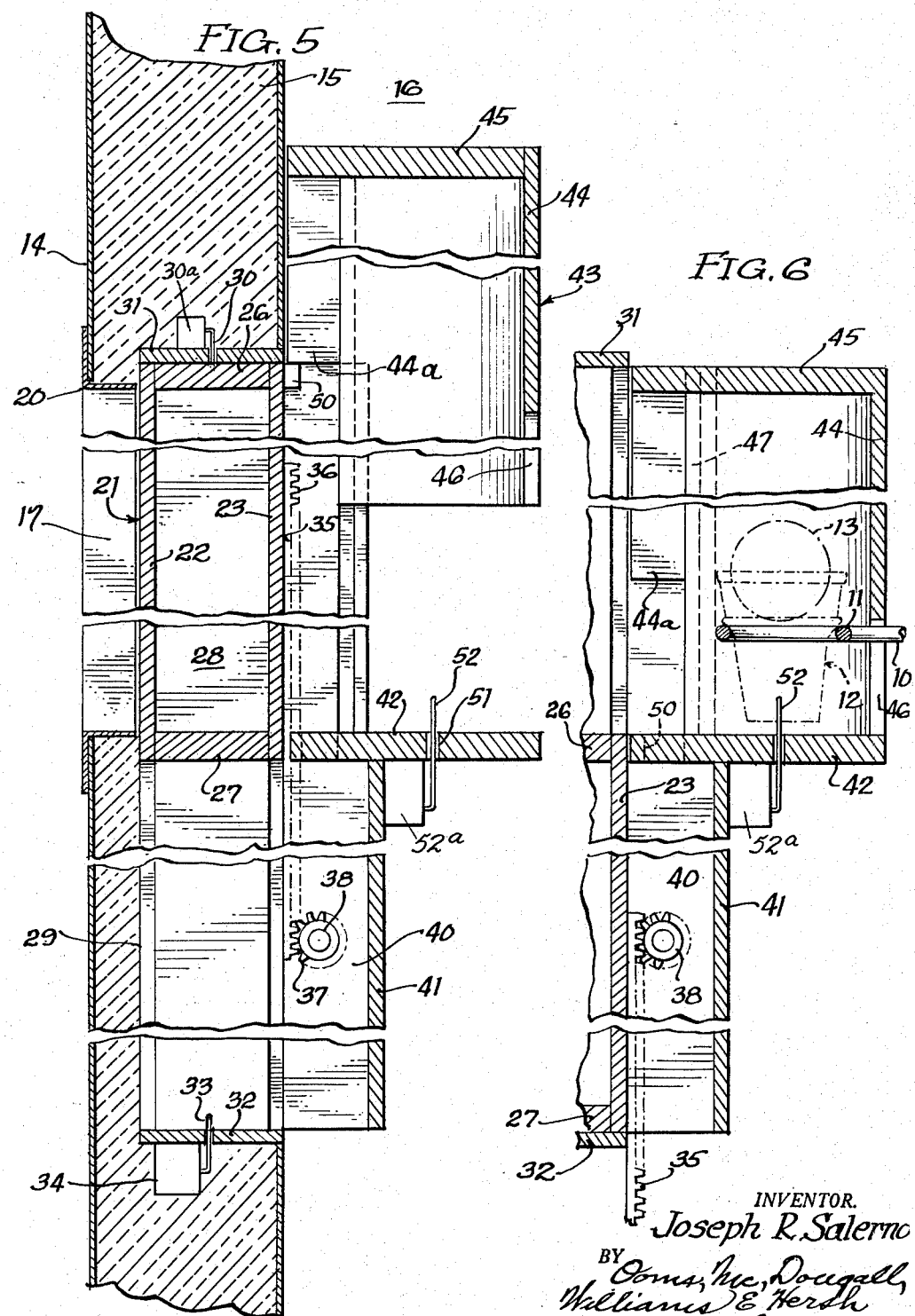

United States Patent Office
2,901,305
Patented Aug. 25, 1959

2,901,305

DOOR ASSEMBLY IN A VENDING MACHINE FOR FROZEN CONFECTIONS

Joseph R. Salerno, Chicago, Ill.

Application August 30, 1954, Serial No. 452,815

9 Claims. (Cl. 312—35)

This invention relates to an automatic vending machine and particularly to an automatic machine for vending ice cream and other frozen confections in the form of cones, sundaes, sodas and the like wherein the ice cream or other frozen confection is dispensed in measured amounts from bulk containers into a suitable vessel, such as a cone or dish, for delivery to an area accessible from the outside for removal and it relates especially to a door construction which effects the desired sealing relation to prevent excessive transfer of heat into the refrigerated space and which is operative to prevent access into the space but which automatically provides an accessible area to which the cone or other confection is delivered for removal by the vendor.

This application is addressed to an improvement in the construction and operation of a vending machine of the type described in the copending application Ser. No. 81,120, filed March 12, 1949, now Patent No. 2,728,306, issued December 27, 1955 and application Ser. No. 112,725, filed August 27, 1949, Tarr Patent No. 2,716,-385, issued August 30, 1955, in which ice cream and other frozen confections are dispensed from bulk containers in a refrigerated space into cones or dishes prepositioned to receive the ice cream or frozen confection for delivery automatically to the vendor. In an automatic machine of the type described which is adapted to be located in widely distributed places for use without personal supervision or the like, there is a tendency for some to seek methods for operating the machine without insertion of the necessary coins for actuation of the machine through a cycle of operation and there is also a possibility of tampering with the working parts of the machine or elements therein such as to effect displacement of cones or the like which would interfere with the subsequent operation of the machine in the manner intended. For such reasons and many others, it is important to provide means for preventing access to the interior of the machine except for such limited areas as are necessary to remove the dish or cone of ice cream or frozen confection delivered by the machine.

In addition to keeping intruders away from the working elements of the machine, it is desirable to provide access to a limited space within the machine for delivery of the vended article without excessive loss of cold from the machine so as to be enabled to maintain the temperature within the machine at a level sufficiently low to keep the ice cream or confection at the desired consistency for use without excessive cost and without interference with the normal operation of the parts.

It is an object of this invention to produce a vending machine of the type described having a closure shiftable between open and closed positions without enabling access to the interior of the machine except for a confined space for removal of the article vended by the machine and which maintains a substantially completely sealed relation for closing off the interior of the machine from the outside during operation of the closure between open and closed positions thereby to minimize the loss of cold from the interior.

More specifically, it is an object of this invention to provide a door construction in an automatic vending machine of the type described which, in normal position, maintains a sealed relation between the interior of the machine and the outside and which is shiftable in response to actuation of the machine through a cycle of operation to an open position in timed relation with the delivery from the machine of the article being vended to permit removal from the outside but which still closes off the interior of the machine from the outside to prevent access to other portions of the machine and to minimize loss of cold from within the machine, and it is a related object to provide means in a construction of the type described which operates to maintain the closure in open position for removal of the article vended until such article is removed and which then automatically returns to closed position in response to removal of the vended article from the machine.

These and other objects and advantages of this invention will hereinafter appear and for purposes of illustration, but not of limitation, an embodiment of the invention is shown in the accompanying drawings in which—

Figure 1 is an elevational view of a fragmentary portion of the machine showing the door construction in closed position to prevent access to the interior of the machine;

Figure 2 is an elevational view corresponding to that of Figure 1 showing the arrangement of parts when the door is in open position for access to the article being vended;

Figure 3 is a sectional view taken substantially along the line 3—3 of Figure 1;

Figure 4 is a sectional view taken substantially along the line 4—4 of Figure 2;

Figure 5 is a sectional elevational view taken along the line 5—5 of Figure 1, and Figure 6 is a sectional elevational view taken along the line 6—6 of Figure 2.

The invention herein will be described in connection with an ice cream cone vending machine of the type described in the aforementioned copending applications wherein during a previous cycle of operation, ice cream from a bulk container is extruded under pressure to fill a cup to form a ball of ice cream until the fluid cup is displaced for operation to release the pressure causing extrusion. In a new cycle of operation initiated upon insertion of coins of the desired denomination for purchase, the cup filled with ice cream is inverted and a cutter is reciprocated back and forth over the wall of the cup during a dwell in the inverted position to free the ball of ice cream from the cup which then falls by gravity into a dish or cone which is waiting underneath. When the cup is returned to upright position and while it is again being filled by extrusion of ice cream from the bulk container, the spider on which the cones are supported is turned one increment to bring the cone with the ball of ice cream therein toward the outer portion of the housing for delivery while another position of the spider having an empty cone therein is located beneath the cup for receiving the ball of ice cream dropped during the next cycle of operation. It will be understood that the concepts which will hereinafter be described are applicable to other types of vending machines where the vended commodity is physically handed out by the machine as with an ice cream cone, soda, sundae and the like commodities incapable of use with a delivery chute or like delivery systems.

As illustrated in the drawings, the numeral 10 indicates the arm of a spider which has a plurality of such arms extending radially in equidistantly spaced apart relation from the center with a holder 11 in the form of a ring in the outer portion dimensioned to receive the cone 12 and which rotates about a vertical axis to position the holder with a cone therein between the cup in one position of adjustment to receive the ball 13 of ice cream released from the cup and to position the holder with the ice cream cone in a subsequent position of adjustment adjacent the exterior of the housing for access from the outside as the door structure hereinafter described is operated from closed to open position.

The walls of the housing in which the vending machine is located, indicated by the numeral 14, are of a double wall construction with insulation 15 in between to reduce the transfer of heat into the space 16 within the machine which is refrigerated to maintain the ice cream or other frozen confection at the desired consistency for use. An access opening 17 is provided in the front wall 14 of the machine at about the level of the spider arm 10 for access to remove the ice cream cone delivered by the arm during operation of the machine.

A frame 20 lines the outer edge portion of the access opening 17 while the inner edge portion thereof is adapted to receive a door structure dimensioned completely to seal off the opening having a length greater than the length of the opening so as to extend beyond the upper and lower edges thereof and a width greater than the width of the opening to extend outwardly beyond the lateral edges into grooves which function as channels for guiding the door 21 during movement between its normally closed position and open position of adjustment.

The door 21 is formed with a double wall construction having a front wall 22 and a back wall 23 joined by side walls 24 and 25 and top and bottom walls 26 and 27 respectively into an integral structure having an insulating dead air space 28 in between. While such construction is preferred for use as an insulated closure, it will be apparent that other constructions in a door having the desired dimensional characteristics with or without double wall construction may be used, especially where insulation is not a requirement.

The interior wall portion of the housing beneath the exit opening 17 is formed with a groove 29 extending downwardly from the exit opening to enable shifting movement of the door 21 from raised or closed position to lowered or open position in which the door member is received substantially completely within the groove 29 with the top edge of the top wall 26 preferably flush with the bottom edge of the exit opening 17. The channel in which the door 21 is shiftable between raised and lowered positions is formed with a stationary top wall 31 having an opening in the central portion thereof through which a switch arm 30 extends into the path of the top wall 26 for actuation of a switch 30a upon being contacted by the top wall upon return to closed position. The channel is also similarly formed with a bottom wall 32 having a switch arm 33 extending upwardly therethrough into the path of the door 21 for actuation of a switch 34 in response to movement of the door to open position.

Rigid with the rear wall of the door 21 is an elongate vertically disposed rack bar 35 having teeth 36 in meshing relation with the teeth 37 of a pinion 38 fixed to the end of a shaft of a reversible motor 39 for actuation of the door between raised and lowered positions of adjustment. The rack bar 35 extends downwardly below the door 21 into meshing relation with the motor driven pinion enclosed within a space 40 below the exit opening defined by the interior wall of the housing, a wall 41 spaced rearwardly therefrom and a top wall in the form of a platform 42 rigid with the housing and extending rearwardly from the exit opening 17 at a level corresponding to that of the bottom edge of the exit opening and the top edge of the door when the latter is in open position.

The horizontally disposed platform 42 is dimensioned to correspond to the contour of an inner door 43 which in the illustrated modification comprises a substantially semi-cylindrical section 44 which is open at the bottom and the front but which has a top wall 45 closing the upper end thereof. The inner door is dimensioned to have a length corresponding to the length of the exit opening so that it will function as a closure for the exit opening when at rest on the upper surface of the platform 42 in closed position. The inner closure 43 is shiftable relative the outer door 21 between raised or open and lowered or closed positions of adjustment. When in raised or open position, the bottom edge of the inner door is spaced from the platform by an amount sufficient to permit free movement of the ice cream cone carried by the spider arm to a position for locating the cone within the space outwardly of the inner door when lowered to closed position. To enable the inner door to be lowered to closed position about the spider arm with a cone therein, the semi-cylindrical section 44 is formed with a groove 46 extending upwardly from the bottom edge in alignment with the arm when at rest. The groove is dimensioned to have a length corresponding to the height of the arm over the platform 42 to enable lowering of the semi-cylindrical section onto the platform without engaging the arm of the spider.

For guiding movement of the inner door between open and closed position, the semi-cylindrical section is formed with flanges 47 extending outwardly from the lateral edges thereof for sliding engagement in vertically disposed grooves 48 provided in rearward extensions 49 of the side walls 24 and 25 of the outer door 21. When in positions other than at rest on the platform 42, the projection 44 of the inner door 43 is supported by lugs 50 extending rearwardly from the upper edge of the outer door 21 in the path of the side walls of the inner door 43 for engagement therewith during movement of the outer door between raised and lowered positions of adjustment. In raised position, the lower edge of the inner door extends downwardly below the upper edge of the outer door 21 so that the inner door engages the platform 42 in closed position prior to the completion of the movement of the outer door from closed to open position with the result that the outer door will continue its opening movement after the inner door comes to rest and the outer door will engage the inner door for displacement during upward movement to closed position when the outer door is spaced from its closed position by an amount corresponding to the spaced relation desired between the bottom of the inner door and the platform in open position.

The platform 42 is provided with an opening 51 through which a switch arm 52 extends into the path of the cone 12 for engagement by said cone and displacement to operative position, thereby to close the circuit in a switch 52a for operation of the motor 39 as the cone comes into position of rest and for release for displacement to another position to actuate a switch for operation of the motor 39 in the opposite direction when the said cone is removed from its supporting structure.

It will be understood that the inner door and platform may be formed of shapes or contours other than round or curvilinear and that the contour of the door may differ from the contour of the platform as long as the platform is able to function as the bottom wall for the door when the latter is in closed position.

Illustration will now be made of the automatic operation of the closure during delivery of an ice cream cone by the machine. At the start, the outer and inner doors 21 and 43 respectively are in the position shown in Figure 1 with the outer door in raised position for closing the exit opening 17 and the inner door resting on the lugs 50 so that sufficient space exists between the bottom of the inner door and the platform 42 for passage of an ice cream cone therebetween.

As the spider is operated in the normal sequence of operations of the vending machine to bring a cone with a ball of ice cream for delivery to the exit opening, the bottom of the cone 12 engages the switch arm 52 to cause displacement thereof. In response to such displacement, the motor 39 is energized to rotate the pinion 38 in counterclockwise direction and cause downward displacement of the rack bar 35 and the outer door rigid therewith. As the outer door is displaced in its channel from closed toward open position, the inner door 43, which rests on the outer door, shifts downward with the outer door and as the lower edge of the inner door comes to rest on the platform, the outer door continues to move downwardly until the bottom wall 27 engages the switch arm 33 for de-energizing the driving motor 39.

In this position, the outer door 21 is withdrawn completely from the exit opening and the inner door 43 shuts off the exit opening from the remainder of the housing so that the purchaser can reach through the exit opening to remove the ice cream cone from the holder without gaining access to the remainder of the housing and with a minimum loss of cold from within the housing.

Until the cone is removed, the parts remain as described and illustrated in Figure 6. Upon removal of the cone, the switch arm 52 is released and causes operation of the driving motor 39 in the reverse direction for actuation of the rack bar 35 and the outer door 21 towards raised position. The outer door rises alone until the lugs 50 rigid with the door engage the inner door 43 whereby the inner door is raised concurrently by the outer door during the remainder of its movement to closed position. Upon reaching closed position, the top wall 26 of the outer door engages the switch arm 30 which functions to de-energize the motor until the next cycle of operation.

It is important to provide means to hold the door in the closed and open positions of adjustment to prevent displacement other than in response to the insertion of the necessary coins or the like to effect operation of the machine through a normal cycle of operation. It is preferred for such purpose to make use of brakes on the motor operatively engaging the door to prevent displacement other than by operation of the motor.

While description herein has been made in the practice of this invention with a machine for dispensing ice cream cones and the like, it will be understood that the concepts in the closure assembly for a housing may be used with vending machines and the like for dispensing other commodities, such as beverages, sodas, sundaes, milk, frozen foods, food stuffs, cigarettes, candy and the like.

In the preferred embodiment, the walls of the inner and outer door are formed of rigid, transparent plastic material so as to enable observation therethrough. It will be understood, however, that the walls of the respective elements may be formed of wood, metal or other rigid material which is not characterized by transparency or translucency and that other changes may be made in the details of construction and operation without departing from the spirit of the invention, especially as defined in the following claims.

I claim:

1. In an automatic vending machine having a housing with a delivery opening to which the article being dispensed is carried by an arm on the machine to a delivery position for removal by the purchaser, means for minimizing communication between the delivery opening and the interior of the housing and to prevent access to the interior of the housing through the outlet opening, comprising an outer door dimensioned to extend vertically and laterally beyond the edges of the delivery opening and mounted within the wall of the housing for shifting movement between a raised or closed position blocking the opening and a lowered or open position in which the outer door is substantially withdrawn from the opening, an inner door spaced inwardly from the outer door by an amount to enable the article delivered by the machine to be positioned therebetween in delivery position and which is mounted for shifting movement between a lowered or closed position blocking the opening and a raised or open position spaced from the base of the opening by an amount to permit the article to be displaced beyond the inner door to delivery position, means in the inner door aligned with the arm supporting the article in vending position to permit the inner door to be lowered beyond the arm to closed position with the article supported outwardly thereof, an operative connection between the outer door and the inner door for controlling movements of the inner door to closed and open positions respectively responsive to movements of the outer door to open and closed positions respectively, power operated means automatically responsive to movement of the article to be dispensed to delivery position for initiating the sequence of door opening and closing operations, and means for preventing displacement of the doors from closed position other than by operation of said power operated means.

2. In an automatic vending machine having a housing with a delivery opening in one wall to which the article dispensed is carried by the machine to a delivery position for removal by the purchaser, means for minimizing communication between the delivery opening and the interior of the housing and to prevent access to the interior of the housing through the outlet opening, comprising an outer door dimensioned to extend vertically and laterally beyond the edges of the delivery opening and mounted in the wall of the housing adjacent the opening for movement in one direction to a closed position blocking the opening and in the other direction to an open position in which the outer door is substantially withdrawn from the opening, an inner door dimensioned to block the delivery opening and mounted for shifting movement in the same direction with the outer door for displacement of the inner door in the one direction from open to closed position while the outer door moves from closed to open position and for movement in the other direction with the outer door for displacement of the inner door from closed to open position while the outer door moves from open to closed position, with a spaced relation between the outer and inner doors dimensioned to enable the article delivered to be located therebetween in delivery position, a platform substantially flush with the bottom of the delivery opening extending inwardly into the housing and upon which the inner door comes to rest in closed position to form the bottom wall thereof, an operative connection between the outer door and the inner door for controlling movements of the inner door to open and closed positions respectively in response to movement of the outer door towards closed and open positions respectively, power operated means automatically responsive to movement of the article to be dispensed to delivery position for initiating the sequence of door opening and closing operations, and means for preventing displacement of the doors from closed position other than by operation of said power operated means.

3. In an automatic vending machine having a housing with a delivery opening in one wall to which the article to be dispensed is carried by an arm of the machine to delivery position for removal, means for minimizing communication between the delivery opening and the interior of the housing and to prevent access to the interior of the housing through the outlet opening, comprising an outer door mounted in the housing wall adjacent the opening for shifting movement vertically upwardly to a closed position blocking the opening and vertically downwardly to an open position in which the outer door is substantially withdrawn from the opening, an inner door spaced inwardly from the outer door to provide a spaced relation therein for receiving the article to be vended in dispensing position and which is mounted for shifting movement downwardly with the outer door to a closed position blocking the opening while the outer door is lowered to its open position and for shifting movement upwardly to an open position with the outer door as the latter moves upwardly to closed position, a platform substantially flush with the bottom of the delivery opening and extending inwardly into the housing and upon which the inner door comes to rest in closed position to form the bottom wall thereof, an operative connection between the outer door and the inner door for controlling movements of the inner door between closed and open positions in response to movement of the outer door towards open and closed positions respectively, and switch operating means extending into the path of the article to be delivered by the machine for initiating movement of the outer door from closed to open position concurrently with movement of the inner door to closed position in response to actuation by the article to be vended in response to movement to vending position.

4. An automatic vending machine as claimed in claim 1 which includes means in the inner door aligned with the arm supporting the article in vending position to permit the inner door to be lowered beyond the arm to closed position with the article supported outwardly thereof.

5. An automatic vending machine as claimed in claim 2 which includes power means operatively connected to the outer door for actuation thereof between open and closed positions in response to movement of the article to be dispensed to its dispensing position and in response to removal thereof respectively.

6. An automatic vending machine as claimed in claim 5 which includes switch operating means in the path of the outer door for engagement in response to movement of the door to open and closed positions and an operative connection between said switch operating means and said power means for stopping operation of said power means upon actuation of said switch operating means.

7. In an automatic vending machine having a housing with a delivery opening to which the article being dispensed is carried by an arm on the machine to a delivery position for removal by the purchaser, means for minimizing communication between the delivery opening and the interior of the housing and to prevent access to the interior of the housing through the outlet opening, comprising an outer door dimensioned to extend vertically and laterally beyond the edges of the delivery opening and mounted within the wall of the housing for shifting movement between a raised or closed position blocking the opening and a lowered or open position in which the outer door is substantially withdrawn from the opening, an inner door spaced inwardly from the outer door by an amount to enable the article delivered by the machine to be positioned therebetween in delivery position and which is mounted for shifting movement between a lowered or closed position blocking the opening and a raised or open position spaced from the base of the opening by an amount to permit the article to be displaced beyond the inner door to delivery position and in which the inner door comprises a semi-cylindrical section closed in the upper end and dimensioned to block the delivery opening when in closed position and a slot extending upwardly from the lower edge for passage of the arm supporting the article in vending position during movement of the door from open to closed position, an operative connection between the outer door and the inner door for controlling movements of the inner door to open and closed positions respectively responsive to movements of the outer door to closed and open positions respectively, power operated means automatically responsive to movement of the article to be dispensed to delivery position for initiating the sequence of door opening and closing operations, and means for preventing displacement of the doors from closed position other than by operation of said power operated means.

8. In an automatic vending machine having a housing with a delivery opening to which the article being dispensed is carried by an arm on the machine to a delivery position for removal by the purchaser, means for minimizing communication between the delivery opening and the interior of the housing and to prevent access to the interior of the housing through the outlet opening, comprising an outer door dimensioned to extend vertically and laterally beyond the edges of the delivery opening and mounted within the wall of the housing for shifting movement between a raised or closed position blocking the opening and a lowered or open position in which the outer door is substantially withdrawn from the opening, an inner door spaced inwardly from the outer door by an amount to enable the article delivered by the machine to be positioned therebetween in delivery position and which is mounted for shifting movement between a lowered or closed position blocking the opening and a raised or open position spaced from the base of the opening by an amount to permit the article to be displaced beyond the inner door to delivery position, an operative connection between the outer door and the inner door for controlling movements of the inner door to open and closed positions respectively responsive to movements of the outer door to closed and open positions respectively, but in which the inner door is free for movement independently of the outer door and in which the operative connection therebetween comprises an abutment on one extending into the path of the other for interconnecting the inner door and the outer door for conjoint movement while the outer door is spaced from its closed position by an amount corresponding to the movement of the inner door between open and closed position, power operated means automatically responsive to movement of the article to be dispensed to delivery position for initiating the sequence of door opening and closing operations, and means for preventing displacement of the doors from closed position other than by operation of said power operated means.

9. In an automatic vending machine having a housing with a delivery opening in one wall to which the article dispensed is carried by the machine to a delivery position for removal by the purchaser, means for minimizing communication between the delivery opening and the interior of the housing and to prevent access to the interior of the housing through the outlet opening, comprising an outer door dimensioned to extend vertically and laterally beyond the edges of the delivery opening and mounted in the wall of the housing adjacent the opening for movement in one direction to a closed position blocking the opening and in the other direction to an open position in which the outer door is substantially withdrawn from the opening, an inner door dimensioned to block the delivery opening and mounted for shifting movement in the same direction with the outer door for displacement of the inner door in the other direction with the outer door for movement of the inner door to closed position while the outer door shifts from closed to open position and for movement in the one direction with the outer door for displacement of the inner door to open position while the outer door moves in the same direction to closed position and with a spaced relation between the outer and inner door dimensioned to enable the article delivered to be located therebetween in delivery position, a platform substantially flush with the bottom of the delivery opening extending inwardly into the housing and upon which the inner door comes to rest in closed position to form the bottom wall thereof, an operative connection between the outer door and the inner door for controlling movements of the inner door to open and closed positions respectively in response to movement of the outer door towards closed and open positions respectively, but in which the inner door is free for movement independently of the outer door and in which the operative connection therebetween comprises an abutment on one extending into the path of the other for interconnecting the inner door and the outer door for conjoint movement while the outer door is spaced from its closed position by an amount corresponding to the distance between the lower edge of the inner door and the platform, power operated means automatically responsive to movement of the article to be dispensed to delivery position for initiating the sequence of door opening and closing operations, and means for preventing displacement of the doors from closed position other than by operation of said power operated means.

References Cited in the file of this patent
UNITED STATES PATENTS

| | | |
|---|---|---|
| 2,575,300 | Schrager | Nov. 13, 1951 |
| 2,637,612 | Warner | May 5, 1953 |